US011501572B2

(12) United States Patent
Naphade et al.

(10) Patent No.: US 11,501,572 B2
(45) Date of Patent: Nov. 15, 2022

(54) OBJECT BEHAVIOR ANOMALY DETECTION USING NEURAL NETWORKS

(71) Applicant: NVIDIA Corporation, San Jose, CA (US)

(72) Inventors: Milind Naphade, Cupertino, CA (US); Shuo Wang, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 3 days.

(21) Appl. No.: 16/363,869

(22) Filed: Mar. 25, 2019

(65) Prior Publication Data
US 2019/0294869 A1 Sep. 26, 2019

Related U.S. Application Data

(60) Provisional application No. 62/648,339, filed on Mar. 26, 2018.

(51) Int. Cl.
*G06V 40/20* (2022.01)
*G06V 20/52* (2022.01)
(Continued)

(52) U.S. Cl.
CPC .......... *G06V 40/20* (2022.01); *G06K 9/6219* (2013.01); *G06K 9/6274* (2013.01); *G06T 7/246* (2017.01); *G06T 7/292* (2017.01); *G06T 7/70* (2017.01); *G06T 7/73* (2017.01); *G06V 10/147* (2022.01); *G06V 10/255* (2022.01); *G06V 20/52* (2022.01); *G06V 20/54* (2022.01); *G06V 20/584* (2022.01); *H04N 5/247* (2013.01); *G06T 2207/10016* (2013.01); *G06T 2207/20081* (2013.01); *G06T 2207/30201* (2013.01); *G06T 2207/30232* (2013.01); *G06T 2207/30241* (2013.01);
(Continued)

(58) Field of Classification Search
None
See application file for complete search history.

(56) References Cited

U.S. PATENT DOCUMENTS 8,284,258 B1 10/2012 Cetin et al.
9,235,766 B2 * 1/2016 Li .......................... H04N 7/185
(Continued)

FOREIGN PATENT DOCUMENTS

WO 2019070535 A1 4/2019

OTHER PUBLICATIONS

Pawar K, Attar V. Deep learning based detection and localization of road accidents from traffic surveillance videos. ICT Express. Nov. 15, 2021. (Year: 2021).*
(Continued)

*Primary Examiner* — Michelle M Entezari
(74) *Attorney, Agent, or Firm* — Taylor English Duma LLP

(57) ABSTRACT

In various examples, a set of object trajectories may be determined based at least in part on sensor data representative of a field of view of a sensor. The set of object trajectories may be applied to a long short-term memory (LSTM) network to train the LSTM network. An expected object trajectory for an object in the field of view of the sensor may be computed by the LSTM network based at least in part an observed object trajectory. By comparing the observed object trajectory to the expected object trajectory, a determination may be made that the observed object trajectory is indicative of an anomaly.

20 Claims, 9 Drawing Sheets

(51) Int. Cl.
　　　*G06V 20/54*　　　(2022.01)
　　　*G06V 20/58*　　　(2022.01)
　　　*G06V 20/62*　　　(2022.01)
　　　*G06T 7/246*　　　(2017.01)
　　　*G06T 7/73*　　　(2017.01)
　　　*G06T 7/292*　　　(2017.01)
　　　*G06T 7/70*　　　(2017.01)
　　　*H04N 5/247*　　　(2006.01)
　　　*G06K 9/62*　　　(2022.01)
　　　*G06V 10/147*　　　(2022.01)
　　　*G06V 10/20*　　　(2022.01)

(52) U.S. Cl.
　　　CPC .. *G06T 2207/30264* (2013.01); *G06V 20/625* (2022.01); *G06V 2201/08* (2022.01)

(56) References Cited

U.S. PATENT DOCUMENTS

| | | | |
|---|---|---|---|
| 9,623,905 B2* | 4/2017 | Shashua | B60W 30/14 |
| 10,365,658 B2* | 7/2019 | Fridman | H04N 7/18 |
| 10,733,457 B1* | 8/2020 | Agnihotram | G08B 13/19602 |
| 10,824,909 B2* | 11/2020 | Ros Sanchez | G06V 10/82 |
| 10,996,069 B2* | 5/2021 | Qiao | G01C 21/3629 |
| 11,104,269 B2* | 8/2021 | Karol | G08G 1/166 |
| 11,216,888 B2* | 1/2022 | Perl | G06N 3/08 |
| 2014/0132786 A1* | 5/2014 | Saitwal | H04N 5/77 348/208.99 |
| 2015/0086071 A1 | 3/2015 | Wu et al. | |
| 2015/0131851 A1 | 5/2015 | Bernal et al. | |
| 2015/0145995 A1 | 5/2015 | Shahraray et al. | |
| 2015/0266421 A1 | 9/2015 | Brubaker | |
| 2016/0125621 A1* | 5/2016 | Saitwal | G06T 7/90 382/165 |
| 2016/0275801 A1* | 9/2016 | Kopardekar | G08G 5/0069 |
| 2016/0307047 A1 | 10/2016 | Krishnamoorthy et al. | |
| 2017/0256165 A1 | 9/2017 | Pennington et al. | |
| 2018/0096595 A1* | 4/2018 | Janzen | G06K 9/0063 |
| 2018/0134215 A1* | 5/2018 | Kim | G07C 5/0825 |
| 2018/0232584 A1 | 8/2018 | Pathangay et al. | |
| 2019/0034794 A1* | 1/2019 | Ogale | G01C 21/3407 |
| 2019/0101924 A1* | 4/2019 | Styler | G08G 1/0112 |
| 2020/0017117 A1* | 1/2020 | Milton | G07C 5/008 |
| 2020/0169662 A1* | 5/2020 | Watanabe | H04N 5/247 |
| 2020/0296172 A1* | 9/2020 | Gunjal | H04L 41/5009 |
| 2020/0361482 A1 | 11/2020 | Choi et al. | |
| 2021/0097370 A1* | 4/2021 | Agnihotram | G06N 3/049 |
| 2021/0125076 A1* | 4/2021 | Zhang | G06N 3/0454 |
| 2021/0158048 A1* | 5/2021 | Lee | G06V 20/52 |
| 2021/0294341 A1* | 9/2021 | Oh | G06N 3/04 |
| 2021/0312725 A1* | 10/2021 | Milton | G06N 3/0454 |
| 2022/0164656 A1* | 5/2022 | Kim | G06N 3/0454 |

OTHER PUBLICATIONS

Piciarelli, Claudio, Christian Micheloni, and Gian Luca Foresti. "Trajectory-based anomalous event detection." IEEE Transactions on Circuits and Systems for video Technology 18.11 (2008): 1544-1554. (Year: 2008).*

Hundman K, Constantinou V, Laporte C, Colwell I, Soderstrom T. Detecting spacecraft anomalies using lstms and nonparametric dynamic thresholding. InProceedings of the 24th ACM GIGKDD international conference on knowledge discovery & data mining Jul. 1, 20189 (pp. 387-395). (Year: 2018).*

Peng H, Klepp N, Toutiaee M, Arpinar IB, Miller JA. Knowledge and situation-aware vehicle traffic forecasting. In2019 IEEE International Conference on Big Data (Big Data) Dec. 9, 2019 (pp. 3803-3812). IEEE. (Year: 2019).*

Jia Y, Wu J, Xu M. Traffic flow prediction with rainfall impact using a deep learning method. Journal of advanced transportation. Aug. 9, 2017;2017. (Year: 2017).*

Notification of Transmittal of International Preliminary Report on Patent Ability (Chapter II of the Patent Cooperation Treaty) in International Patent Application No. PCT/US2019/023924 dated Mar. 4, 2020.

Fernando, T., Denman, S., Sridharan, S., & Fookes, C. (2018). Soft+ hardwired attention: An lstm framework for human trajectory prediction and abnormal event detection. Neural networks, 108, 466-478.

Preinterview First Office Action dated Aug. 28, 2020, in U.S. Appl. No. 16/365,581, 12 pages.

International Preliminary Report on Patentability received for PCT Application No. PCT/US2019/024145, dated Oct. 8, 2020, 13 pages.

First Action Interview Office Action dated Oct. 26, 2020, in U.S. Appl. No. 16/365,581, 13 pages.

International Search Report and Written Opinion dated Jun. 26, 2019 in International Patent Application No. PCT/US2019/023924, 15 pages.

Xue, H., Huynh, D. Q., & Reynolds, M. "Bi-prediction: Pedestrian Trajectory Prediction Based on Bidirectional LSTM Classification", 2017 International Conference on Digital Image Computing: Techniques and Applications (DICTA) (pp. 1-8). IEEE, Nov. 29, 2017. XP033287302.

Tharindu, Fernando et al.: "Soft + hardwired attention: An LSTM Framework for Human Trajectory Prediction and Abnormal Event Detection", arxiv.org, Cornell University Library, Ithaca, NY, Feb. 18, 2017. XP080747560.

Xiao, Ling et al.: "Identifying parking spaces & detecting occupancy using vision-based IoT devices", 2017 Global Internet of Things Summit (GIOTS), IEEE, Jun. 6, 2017 (Jun. 6, 2017), pp. 1-6, XP033145194.

Masmoudi, Imen et al: "Multi agent parking lots modelling for anomalies detection while parking", IET Computer Vision, vol. 10, No. 5, Aug. 1, 2016 (Aug. 1, 2016), pp. 407-414, XP055595549.

International Search Report and Written Opinion dated Aug. 26, 2019 in International Patent Application No. PCT/US2019/024145, 21 pages.

Notice of Allowance dated Jul. 13, 2021, in U.S. Appl. No. 16/365,581, 7 pages.

Invitation to pay additional fees received for PCT Patent Application No. PCT/US2019/024145, mailed on Jun. 27, 2019, 13 pages.

Preinterview First Office Action dated Aug. 23, 2021 in U.S. Appl. No. 16/896,431, 19 pages.

First Action Interview Office Action dated Nov. 1, 2021 in U.S. Patent Application No. 16/896,431, 18 pages.

Notice of Allowance dated Apr. 26, 2022 in U.S. Appl. No. 16/896,431, 9 pages.

* cited by examiner

OBJECT BEHAVIOR ANOMALY DETECTION USING NEURAL NETWORKS

CROSS-REFERENCE TO RELATED APPLICATIONS

This application claims the benefit of U.S. Provisional Application No. 62/648,339, filed on Mar. 26, 2018, titled "Systems and Methods for Smart Area Monitoring," which is hereby incorporated by reference in its entirety.

BACKGROUND

As cameras are increasingly positioned along intersections and roadways, more opportunities exist to record and analyze traffic in an effort to understand traffic flow, congestion, pedestrian and vehicle safety, and emergency situations. To analyze traffic, existing approaches generally require human input to customize the video analysis of traffic camera data. However, the variability that exists in visual information captured by cameras is extensive (e.g., resulting from camera functionality, camera vantage point, scene observed, environment, etc.). As a result, it is inefficient and ineffective to manually adapt to such variability to accurately analyze traffic and identify relevant and timely insights about traffic flow, safety, and incidents.

SUMMARY

Embodiments of the present disclosure relate to anomaly detection in object behavior using inference. Systems and methods are disclosed that provide real-time insights pertaining to object motion (e.g., traffic flow), such as anomalies and various trajectory features (e.g., traffic flow, speed, etc.).

In operation, embodiments described herein are directed to tracking objects, such as vehicles or pedestrians, and using the object trajectories to learn real-time object movement insights. In this regard, insights customized in accordance with operation constraints and environmental conditions may be obtained without any human intervention. At a high level, one or more monitoring or sensor devices (e.g., a camera) may continuously monitor a region of the physical environment. As the monitoring device continues to monitor over time, patterns of behavior observed through video analysis may be learned. Any observed behavior that is inconsistent with expected patterns of behavior may constitute an anomaly or incident, which may be reported via a message (e.g., an alert, a signal, or other means). Continuous monitoring of object movement may also enable identification of various trajectory features, such as average speeds, vehicle flow, traffic patterns, etc.

BRIEF DESCRIPTION OF THE DRAWINGS

The present systems and methods for anomaly detection in object behavior using inference is described in detail below with reference to the attached drawing figures, wherein.

DETAILED DESCRIPTION

Figure 1:
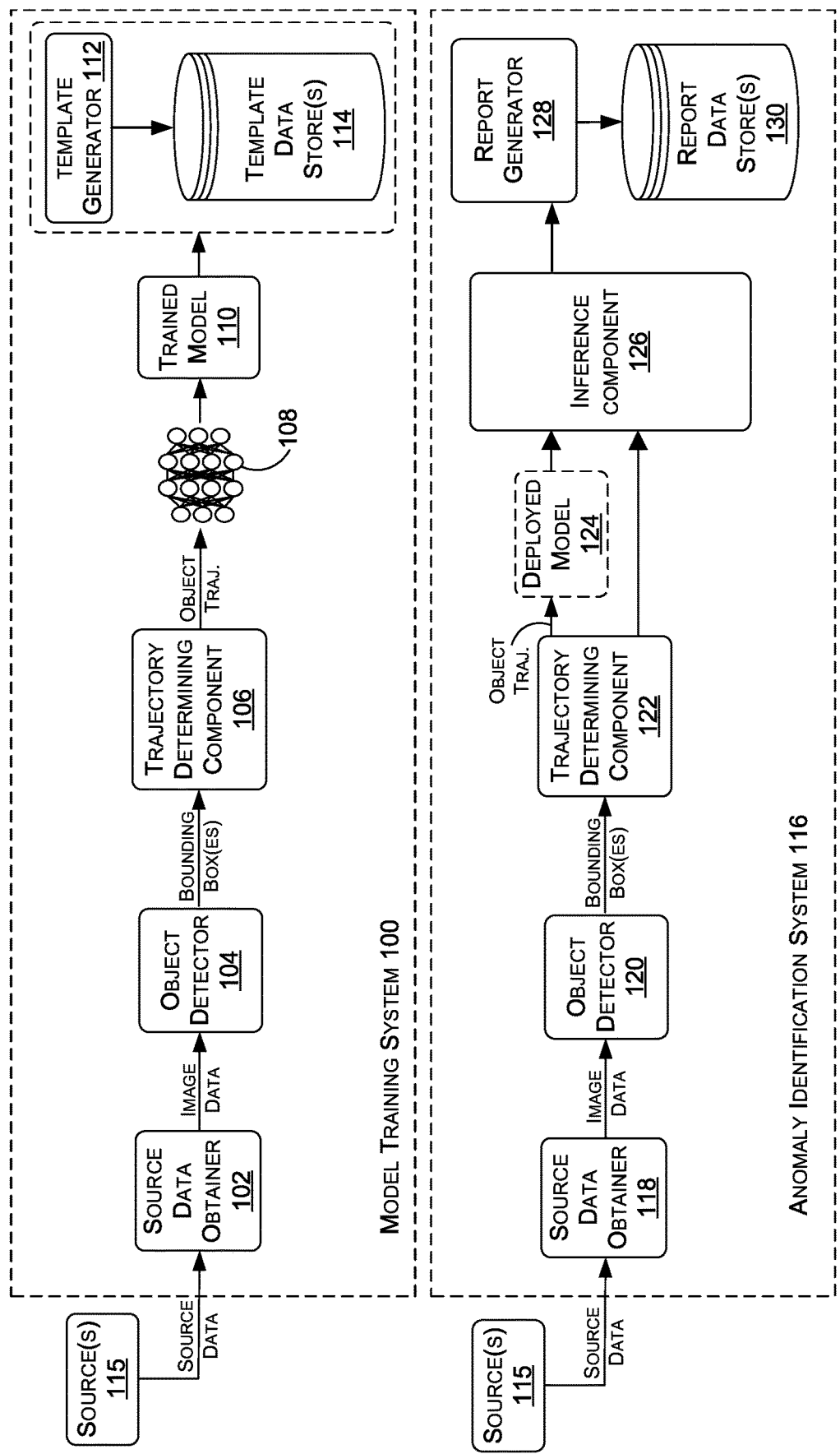
FIG. 1 is an example system diagram of a model training and anomaly identification system, in accordance with some embodiments of the present disclosure.

Analyzing traffic at intersections and along roadways is vital to managing traffic flow, minimizing congestion and GHG emissions, maximizing the safety of pedestrians and vehicles, and responding to emergency situations. While there is an increasing proliferation of cameras along our road networks, existing systems have been unable to monitor camera feeds in real-time and use the information to effectively manage or otherwise react to certain traffic conditions along roadways. For example, these existing systems may have limited capabilities that only allow for detecting a fixed set of observation types. In particular, specific rules may typically be tailored to perform video analysis. For example, existing approaches may require specific input to customize video analysis of traffic camera data for each camera at each location. This may be the result of the extensive variability that exists in the visual information being captured by cameras located at different locations. Such visual variability may occur for any number of reasons, such as, as a function of the camera, the camera vantage point, the scene being observed, the environment, weather conditions (e.g., wind, rain, hail, dust etc.), and/or the time of day (e.g., impacting ambient lighting, shadows etc.). Because of the extensive visual variations that may result for each camera, it may be inefficient and ineffective to generate customized video analytics to cover the vast amount of conditions that each individual camera will encounter, and even more so that different cameras will encounter, thereby impeding effective use of these traffic cameras for extracting relevant and timely insights about traffic flow, safety, and incidents.

Accordingly, embodiments described herein are directed to tracking objects, such as vehicles or pedestrians, and using the object trajectories to learn real-time object movement insights, such as anomalies and various trajectory features. In this regard, insights customized in accordance with operation constraints and environmental conditions may be obtained without any human intervention. At a high level, a monitoring or sensor device(s) (e.g., a camera) may continuously monitor a region of the physical environment. As the monitoring device continues to monitor over time, patterns of behavior observed through video analysis may be learned. Any observed behavior that is inconsistent with expected patterns of behavior may constitute an anomaly or incident, which may be reported via a message (e.g., an alert or other means). Continuous monitoring of object movement may also enable identification of various trajectory features, such as average speeds, vehicle flow, etc.

In operation, upon capturing a video, motion of an object in the video may be tracked to generate an object trajectory that includes a series of positions of the object with corresponding time stamps, in some examples. The object trajectory, along with numerous other object trajectories observed over time, may be used as input into a machine learning model (e.g., a long short-term memory (LSTM) network) of a model training system. The machine learning model may learn from the trajectories observed over the lifetime of the camera (or at least over the training period for the machine learning model) viewing the specific region within the field of view of the camera. In addition to object trajectories, the model training system may use various attributes to train the machine learning model (e.g., the LSTM network) as a normal object behavior model. For example, in some cases, the model training system may use weather conditions, lighting conditions, traffic conditions, or the like as inputs to the machine learning model to train the machine learning model to learn normal object behaviors (e.g., expected object trajectories, or properties thereof). In some examples, the machine learning model, after training is completed, may represent a collection of normal object behaviors. Advantageously, this approach allows the generation of a normal object behavior model for a camera that accounts for variable conditions and environments in a field of view of the camera without the need for manual customization or labeled data.

For real-time insights, such as anomalies and trajectory features, the motion of an object captured in a video may similarly be tracked to generate an observed object trajectory that includes a series of positions of the current object and corresponding time stamps. The observed object trajectory may be input into an inference component that also uses the trained (or deployed) machine learning model and/or normal object behavior templates (e.g., as computed by the machine learning model) as an input to identify anomalies with respect to the current observed object trajectory. More specifically, the inference component may use the LSTM network and the current object trajectory to compute a deviation from normal object behavior. The deviation may then be used by the inference component to output a confidence that the current object trajectory is indicative of an anomaly with respect to an expected object trajectory, or properties thereof (e.g., speed, velocity, etc.). This may also allow for automated computation of traffic data, such as real-time traffic speed distribution, traffic flow rate, and the like.

Turning initially to FIG. 1, FIG. 1 illustrates an example system for training a machine learning model and using the machine learning model to identify anomalies, particularly anomalies in object behavior. Referring to FIG. 1, a schematic depiction is provided illustrating an example model training system 100 in which some embodiments of the present disclosure may be employed. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The model training system 100 may include, among other things, a source data obtainer 102, an object detector 104, a trajectory determining component 106, a training component 108, a trained model 110, a template generator 112, and one or more template data stores 114. The model training system 100 (and the components and/or features thereof) may be implemented using one or more computing devices, such as the computing device 800 of FIG. 8, described in more detail below.

The source data obtainer 102 may generally be configured to obtain source data. Source data may generally refer to any type of data that may be collected from a source providing data associated with an object(s) and/or movement thereof. As one example, source data may include image data—representative of still images or a video—that depicts object movement. As another example, source data may include or indicate object trajectory attributes. Object trajectory attributes may include attributes associated with an object, an object movement, and/or the environment associated with the object. For instance, object trajectory attributes may include weather conditions, time/day aspects, traffic conditions, lighting conditions, speed, velocity, acceleration, yaw rate, turning angle, and/or other attributes. Source data may be collected, generated, and/or obtained from any number of sources, such as sensors (e.g., image sensors of one or more cameras, LIDAR sensors, RADAR sensors, etc.), files, databases, data stores, servers, and/or other sources.

To obtain or collect source data, a source, such as source(s) 115 of FIG. 1, within an environment may be used to capture various aspects of data. A source may be one or more sensors, and the sensor(s) may include, for example, a camera (e.g., a video camera, a monocular camera, a stereoscopic camera, a 360 degree camera, a wide-view camera, etc.), a LIDAR sensor, a RADAR sensor, a speed sensor, a weather sensor, and/or the like. For example, one or more cameras positioned within the environment may be used to capture image data (e.g., images and/or video) of the environment within a field(s) of view of the camera(s). As another example, one or more weather sensors, speed sensors, and/or other sensor types may be able to capture a temperature, a wind velocity, a precipitation measure, object speeds, accelerations, and/or velocities, and/or the like, of one or more aspects of the weather or the objects (e.g., vehicles, pedestrians, animals, drones, aircraft, etc.) in the environment. The source(s) 115 may provide source data to the source data obtainer 102 directly or via a network, computing device, and/or the like.

The source data (e.g., image data, LIDAR data, RADAR data, etc.) may be analyzed to identify or generate training data that may be used by the training component 108 to generate the trained model. In some examples, the source data may be analyzed to identify or determine object trajectories. An object trajectory may refer to a path followed by a moving object in addition to, in some examples, one or more attributes or characteristics of the object along the path (e.g., speed, velocity, acceleration, turning angle, yaw rate, etc.). Although an object is generally referred to herein as a vehicle (e.g., car, truck, bike, motorcycle, etc.), an object may be any moving item, such as a person, an animal, another vehicle type, an inanimate object, etc. Although the source data may generally be described as being analyzed prior to being used by the training component 108, this is not intended to be limiting. In some examples, the source data may not be analyzed prior to being used by the training component 108, or may have already been analyzed or otherwise pre-processed (e.g., by another system, previously, etc.), and thus may be directly input to the training component 108 once obtained (e.g., from a data store, via a network, from another system, and/or the like).

An object trajectory may be represented in any number of ways. One way in which an object trajectory may be represented includes a set or series of positions or coordinates of an object and corresponding times (e.g., timestamps) for the positions. In this regard, captured source data (e.g., image data or other sensor data) may be analyzed to identify or determine the object trajectory(ies). For example, an object detector 104 may analyze source data (e.g., a video, still images, LIDAR data, etc.) to identify an object(s) within the field of view of the sensor (e.g., a camera(s) or other source(s) 115). In this regard, object detection may be performed to detect one or more objects within the source data (e.g., within a video represented by image data captured by a camera(s)). Object detection may be performed in any number of ways, such as, for example, via machine learning (e.g., convolutional neural networks) or other computer vision algorithms. Detected objects may be indicated, for example, using a bounding box.

Trajectory determining component 106 may determine an object trajectory(ies) for the one or more detected objects. For example, the detected object(s) may be tracked or monitored to identify the object trajectory(ies). For instance, in some cases, machine learning algorithms may be used to track an object and convert pixels (e.g., 2D locations of pixels) associated with object movement to real-world coordinates (e.g., 3D real-world coordinates).

In some cases, object trajectories represented by a set of positions or coordinates of an object may be projected into a map view (e.g., for ease of visualization). In this way, a map visualization that includes a map of the environment (e.g., from a GPS application, from a satellite image, etc.) overlaid with a visualization (e.g., path) of the object trajectory may be generated. In some cases, the map on which the object trajectory visualization is overlaid may be based on the environment captured from the source data. In other cases, a pre-generated map (e.g., accessible via the World Wide Web) may be accessed and used to generate the map view. By way of example only, and not limitation, a map view may be a bird's eye-view projection of sensed vehicles or objects overlaid or integrated with a map.

Object trajectories (e.g., represented by a set of coordinates and times associated with the object movement), and other training data (e.g., object trajectory attributes, such as weather conditions at time of object movement, etc.), may be input into the training component 108 to generate the trained model 110. Training data may generally refer to any type of data that may be used by the training component 108 to generate the trained model 110, which may represent normal object behavior. In some examples, the training data may include data associated with an object(s) and/or movement(s) thereof. In this way, the training data may indicate a set of positions of an object, time(s) associated with object movement, and/or object trajectory attributes, such as environmental conditions associated with the object or object motion, or the like.

Although the training component 108 of FIG. 1 includes a general illustration of a neural network, this is not intended to be limiting. For example, the training component 108 may be used to train any type of machine learning model, such as machine learning models using linear regression, logistic regression, decision trees, support vector machine (SVM), Naive Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

In examples where the training component 108 includes a neural network, the neural network may be updated for error during training to generate the trained model 110. Error in the network may be determined in any number of ways. In some examples, error may be determined based on differences between the output from the network (e.g., a prediction) and a ground truth output (e.g., an observation). The ground truth output may be a known output corresponding to an input such that if the neural network is trained optimally, or otherwise to a desired level of accuracy, the output from the neural network will be substantially the same as, or within a threshold similarity to, the ground truth. In other examples, the training may be unsupervised (e.g., without using ground truth data), or may be semi-supervised (e.g., a combination of supervised and unsupervised), depending on the embodiment. In any example, the error determined (e.g., using one or more loss functions) during training may then be used to further refine and train the neural network (e.g., through backward passes, backpropagation, parameter updates, etc.) through a number of iterations.

In some examples, the training component 108 may generate the trained model 110 as a recurrent neural network (RNN). In such examples, a long short-term memory (LSTM) network may be used to generate the trained model 110. A LSTM network may be well-suited to generate predictions based on time series data as there may be lags of unknown duration between events in a time series. A LSTM network may be trained using object trajectories, such as coordinates of a moving object and corresponding times. The LSTM network may be trained using an optimization algorithm—such as gradient descent—combined with backpropagation through time to compute the gradients needed during the optimization process in order to change each weight of the LSTM network in proportion to the derivative of the error (at the output layer of the LSTM network) with respect to the corresponding weight.

By way of example only, the training component 108 may train a LSTM network by receiving as input an observed object trajectory and, in some cases, additional object trajectory attributes (e.g., weather conditions at time of object movement, traffic, speed, acceleration, velocity, object type, etc.). The LSTM network may analyze the input and output a prediction of a subsequent position(s) of the object (a predicted object position) based on the observed object trajectory. To train the LSTM network, the LSTM network may then correct for errors by comparing the predicted object position(s) (or the observed object trajectory and the predicted object position) to the actual object trajectory. As one example, a predicted object position is compared to the actual object trajectory of the object to correct for errors. As another example, a predicted object trajectory that includes the predicted object position and the observed trajectory (e.g., at a first instance (T1)) may be compared to the actual trajectory of the object (e.g., at a second instance (T2) that includes the time corresponding with T1 and the predicted object position).

The trained model 110 may be generated by the training component 108 using the object trajectories and/or object attributes. The trained model 110 may include one or more models. Once it is determined that the trained model 110 has acceptable accuracy, the trained model 110 may be deployed (e.g., as the deployed model 124). The determination that a trained model 110 has acceptable accuracy may include a threshold accuracy, such as, for example and without limitation, 80%, 90%, 98%, etc. The threshold accuracy may be predefined by the model training system 100, or may be user defined.

As can be appreciated, the trained model 110 may be continually or periodically trained or updated over time to adapt to object behavior observed in the environment. As such, what is considered normal behavior can be expanded or adjusted over time and in accordance with changes in the environment. For example, assume a street is modified (e.g., expanded, extended, narrowed, etc.) during a time period in which a camera is capturing image data (e.g., a T intersection is expanded to a four-way intersection). In accordance with the street modification, the trained model may be updated to adapt to new object behaviors in addition to or instead of behavior previously considered normal. As such, what was once anomalous behavior may be updated over time to reflect the environment modification (e.g., street construction), rather than redeploying a new model or constantly raising alarms for false positive anomalies.

In some implementations, the trained model 110 may be used by the template generator 112 to generate trajectory templates. A trajectory template may refer to a pattern of object movement designated as a normal or expected object trajectory. The trajectory templates may be generated in accordance with various object trajectory attributes, such as but not limited to those described herein (e.g., object movement attributes and/or environmental attributes). For example, the object trajectory attributes may include weather conditions, time/day aspects, traffic conditions, lighting conditions, speed, velocity, acceleration, yaw rate, turning angle, and/or the like. In this way, various trajectory templates may be generated that correspond with different types of weather conditions, different time periods of days or different days of weeks, different traffic conditions (e.g., a number and/or speeds of vehicles), different lighting conditions, and/or the like. By way of example, one trajectory template may correspond with a time period during which precipitation is occurring, while another trajectory template corresponds with a time period during which no precipitation is occurring. Trajectory templates may be generated in connection with any type and combination of attributes and is not intended to be limiting herein.

To generate trajectory templates, the template generator 112 may input observed object trajectories associated with various attributes or conditions into the trained model 110 and obtain as output a predicted object position, or a set of object positions. The predicted object positions and observed object trajectories may then be used to generate templates associated with various attributes (e.g., time periods, days, weather conditions, traffic conditions, etc.). As such, an extensive amount of object trajectories may be observed based on source data (e.g., videos, images, LIDAR data, etc.) captured from sensor(s) (e.g., camera(s), LIDAR sensor(s), etc.) within a field(s) of view of the sensor(s). The observed object trajectories may then be used to learn patterns associated therewith—in accordance with various times of day, days of week, weather conditions, lighting conditions, traffic conditions, etc.—to generate or create a library of patterns. The generated trajectory templates may be stored in a template data store(s) 114, as in FIG. 1.

With continued reference to FIG. 1, a schematic depiction is provided illustrating an example anomaly identification system 116 in which some embodiments of the present disclosure may be employed. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The anomaly identification system 116 may include, among other things, a source data obtainer 118, an object detector 120, a trajectory determining component 122, a deployed model 124, an inference component 126, a report generator 128, and one or more report data store 130. As described herein, in some examples the trained model 110 may be the same as the deployed model 124, while in other examples, the trained model 110 may be used to generate the deployed model 124. The anomaly identification system 116 (and the components and/or features thereof) may be implemented using one or more computing devices, such as the computing device 800 of FIG. 8, described in more detail below.

The source data obtainer 118 may generally be configured to obtain source data. As described above, source data may generally refer to any type of data that may be collected from a source providing data associated with an object(s) and/or movement thereof. As one example, source data may include image data—representative of still images or a video—that depicts object movement. As another example, source data may include or indicate object trajectory attributes. Object trajectory attributes may include attributes associated with an object, an object movement, and/or the environment associated with the object. Source data may be collected, generated, and/or obtained from any number of sources, such as sensors (e.g., image sensors of one or more cameras, LIDAR sensors, RADAR sensors, etc.), files, databases, data stores, servers, and/or other sources.

To obtain or collect source data, a source, such as source 115(*s*) of FIG. 1, within an environment may be used to capture various aspects of data. The source(s) 115 may provide source data to the source data obtainer 118 directly or via a network, computing device, and/or the like. As can be appreciated, the source providing data to the anomaly identification system 116 may be the same or different from the source providing data to the model training system 100. Further, source data may be provided by any number of sources (e.g., located in a same environment/region or located in various or distributed environment/regions).

The source data (e.g., image data, LIDAR data, RADAR data, etc.) may be analyzed to identify or generate input data that may be used to identify anomalies. In some examples, the source data may be analyzed to identify or determine object trajectories. Object trajectories may be identified or determined, for example, in a manner similar to that as described above with respect to the model training system 100.

In this regard, an object detector 120 may analyze source data (e.g., a video, still images, LIDAR data, etc.) to identify an object(s) within the field of view of the sensor (e.g., a camera(s) or other source(s) 115), and the trajectory determining component 122 may determine an object trajectory(ies) for the one or more detected objects. In some examples, object trajectories (e.g., represented by a set of coordinates, times associated with the set of coordinates, etc.) and other input data (e.g., object trajectory attributes, such as weather conditions at time of object movement, etc.), may be input into the deployed model 124 to predict a subsequent position of an object, or set of object positions (generally referred to herein as predicted object position(s)). Input data may generally refer to any type of data that may be used by the deployed model 124 and/or the inference component 126 to generate output. In embodiments, input data includes data associated with an object(s) and/or movement thereof. In this way, the input data may indicate a set of positions of an object, times associated with the set of positions and/or object movement, and/or object trajectory attributes, such as but not limited to those described herein.

The deployed model 124 may be generated, at least in part, by the training component 108 of the model training system 100 using training data (as described herein). In some examples, as described herein, the deployed model 124 may be the trained model 110, may be one of the trained models 110, and/or may be the trained model 110 after additional accuracy checking, retraining, in-deployment training (e.g., continuous training during deployment), and/or the like.

Based on the input data provided to the deployed model 124, such as an object trajectory (or a portion thereof) associated with an object, the deployed model 124 may predict a subsequent position, or set of positions, of the object. As can be appreciated, the deployed model 124 may utilize various types of input data to predict a subsequent position or set of positions. For example, object trajectory attributes, such as day/time, weather conditions, lighting conditions, and/or traffic conditions, may be used by the deployed model 124 to predict a subsequent position or set of positions. Further, in some cases, the deployed model 124 may predict other attributes associated with the object trajectory. For example, the deployed model 124 may predict or provide a time(s) associated with the predicted subsequent position(s) of the object, a speed, a velocity, and/or an acceleration of the object, etc.

The deployed model 124 may be adjusted or adapted over time to account for changing object behaviors. In this way, the deployed model 124 may change over time to adapt to behavior observed in the environment. Advantageously, updating the deployed model 124 to reflect changing object trajectories enables a more accurate detection of anomalies thereby reducing false anomaly alerts or notifications.

The inference component 126 may generally be configured to infer or detect anomalies associated with object motion. In this regard, the inference component 126 may determine an occurrence or an extent of deviations of an observed and/or an actual object trajectory(ies). To do so, the inference component 126 may compare an observed or actual object trajectory with an expected object trajectory (e.g., predicted object trajectory and/or trajectory template(s) as generated by the deployed model 124) to identify whether a deviation exists and/or an extent of a deviation. In examples where a deviation exists, and/or an extent of a deviation (threshold deviation) is exceeded, the object trajectory may be designated as an anomaly.

In some examples, the inference component 126 may use the deployed model 124 to obtain a predicted object position(s) as an output of the deployed model 124 to identify an object trajectory anomaly. In other examples, the inference component 126 may use the deployed model 124 to obtain a predicted object trajectory (including the observed object trajectory and the predicted object position(s) output by the deployed model) to identify an object trajectory anomaly. The inference component 126 may obtain the predicted object position(s) or predicted object trajectory as an expected object trajectory via the deployed model 124. The inference component 126 may then compare the expected object trajectory to the actual or observed object trajectory. As one example, a predicted object position(s) associated with a first instance (T1) generated from the deployed model 124 based on an observed object trajectory, or portion thereof, may be compared to the actual object trajectory associated with the first instance (T1). As another example, a predicted object position(s) associated with a first instance (T1) may be output from the deployed model 124 based on at least a portion of an observed object trajectory. The inference component 126 may aggregate or combine the predicted object position(s) with the observed object trajectory to generate a predicted object trajectory. The predicted object trajectory may then be compared to the actual or observed trajectory of the object that includes the position of the object at the first instance (T1). Based on the comparison, the inference component 126 may generate a deviation score to indicate an amount of deviation between the predicted object trajectory and the actual object trajectory. For example, the inference component 126 may output a confidence score (e.g., between 0 and 1) to indicate an amount of deviation. Based on the deviation score, a determination may be made as to whether the actual object trajectory is indicative of an anomaly. For instance, when the deviation score exceeds a threshold value (e.g., a threshold of 0.4 on a scaled from 0 to 1), the actual object trajectory may be identified (e.g., flagged) or otherwise designated as an anomaly.

In another implementation, the inference component 126 may use a trajectory template(s) to identify an object trajectory anomaly. In particular, the inference component 126 may obtain an observed object trajectory as input data (instead of a predicted object position(s) determined via the deployed model 124). The inference component 126 may then compare the observed object trajectory to one or more trajectory templates representing an expected object trajectory(s). As one example, based on an input object trajectory and/or attributes associated therewith (e.g., weather conditions, lighting conditions, traffic conditions, time period, etc.), the inference component 126 may reference a corresponding trajectory template(s) from template data store 114. The observed object trajectory may then be compared to the trajectory template(s). Based on the comparison, the inference component 126 may generate a deviation score or confidence score to indicate an amount of deviation between the deviation template representing a normal or expected object trajectory and the actual object trajectory. For instance, the inference component 126 may output a confidence score (e.g., between 0 and 1) to indicate an amount of deviation. As can be appreciated, in cases that the actual object trajectory is compared to multiple trajectory templates (e.g., a first template with corresponding weather conditions and a second template with corresponding time and/or day), multiple deviation scores may be generated in association with each template. Alternatively, a global score may be generated. A global score may include an aggregation of scores (e.g., a sum or weighted sum of individual template scores), a score generated from a portion of the scores (e.g., an average of the two highest scores or the two lowest scores), or the like. Based on the deviation score(s), a determination may be made as to whether the actual object trajectory is indicative of an anomaly. For instance, when the deviation score exceeds a threshold value (e.g., a threshold of 0.4 on a scale of 0 to 1), the actual object trajectory may be deemed or designated as an anomaly.

Additionally or alternatively to the inference component 126 generating a deviation score used to predict anomalies, the inference component 126 may generate an anomaly confidence score (e.g., using a deviation or deviation score) indicating a confidence that an observed or actual object trajectory is an anomaly or aberration from normal or expected pattern behavior (as indicated via trajectory templates or object position predictions).

Further, as can be appreciated, the inference component 126 may use both implementations described herein to identify anomalies. In other words, the inference component 126 may compare actual object trajectories with predicted object trajectories (or portions thereof) generated via deployed model 124 as well as compare observed object trajectories with trajectory templates to generate anomaly inferences. For instance, two different deviation scores may be generated and aggregated (e.g., averaged or weighted averaged) or independently analyzed to determine a confidence of an inferred anomaly.

The report generator 128 may generally be configured to generate reports related to object trajectories. The report generator 128 may generate the reports persistently, at intervals, upon user request, and/or at another cadence. The reports may be generated based at least in part on user programs, such as one report a day, one report a week, one report a month, etc. The reports may be transmitted to a client device(s) associated with users of the anomaly identification system 116. For example, the reports may be included in messages (e.g., signals) that are transmitted to the client device(s) (e.g., persistently, at intervals, upon user requests, etc.). In some examples, once a user opens an application and/or a graphical user interface (GUI) on a client device, one or more messages including the reports may be obtained (e.g., downloaded, retrieved, received, etc.) from the anomaly identification system 116 (and/or another system). For example, the data representing the reports may be stored on one or more servers associated with a system (e.g., report data store(s) 130), and upon request, upon opening an application, and/or upon accessing a GUI associated with the report(s), the messages including the report(s) may be downloaded to the client device.

Once the messages are received by the client device(s), the necessary data for generating the reports may be accessible to the client device(s). For example, once received, if the application is not open and/or a GUI for viewing the reports is not open, a notification may be generated. The notification may be a push notification (e.g., a ribbon, banner, pop-up, etc.), an in-application notification (e.g., a number representative of a number of reports available for viewing, or other symbol), and/or may be another type of notification. In examples where the application and/or the GUI is open, the reports may be populated within the application and/or the GUI.

The reports may include various types of information or features related to object trajectories. Features related to object trajectories may include, for instance, indications of object trajectory anomalies, amounts of deviation of object trajectories, object speed, object velocity, object acceleration, object direction, objection location details, object steering angles, lane in which object is positioned, traffic flow rates, or the like. Such features may be specific to an object trajectory or representative of a set of object trajectories. For instance, an average speed feature may indicate an average speed of objects or average object speed per lane. Based on global features (e.g., speeds or anomalies), traffic conditions, such as a traffic jam or vehicle accident, may be inferred or identified.

The report generator 128 may also generate features or data to include in the report. For example, the report generator 128 may use the object trajectory (and/or corresponding attributes), anomaly inferences, deviation inferences, trajectory templates, predicted object positions, and/or the like to determine features related to object trajectories. A report may include a set of predefined features or a set of identified features (e.g., a pattern or frequency of a particular feature, such as a decreased speed detected among multiple objects). In some examples, features related to object trajectories may be determined in an unsupervised manner (e.g., the inference component 126 and/or the deployed model 124 may learn to identify one or more anomalies without being specifically trained identify the anomalies).

A report may include graphs, charts, tables, text, audio, video, and/or other forms of information. For example, graphs or charts may be provided to illustrate a feature or set of features over time. As another example, graphs or charts may be provided to illustrate a feature or set of features associated with a set of objects. Text and/or audio may be provided to convey information and to alert a user as to a particular feature, such as a feature (e.g., speed or number of anomalies) exceeding a threshold value. In some cases, a video capturing the objects may be provided to convey information to a user. In such a case, overlays of text, charts, visual emphasis, etc. may be incorporated with the video to provide information to a user. Examples of various features provided in reports are described in more detail herein with respect to FIGS. 3A-3E.

Figure 2:
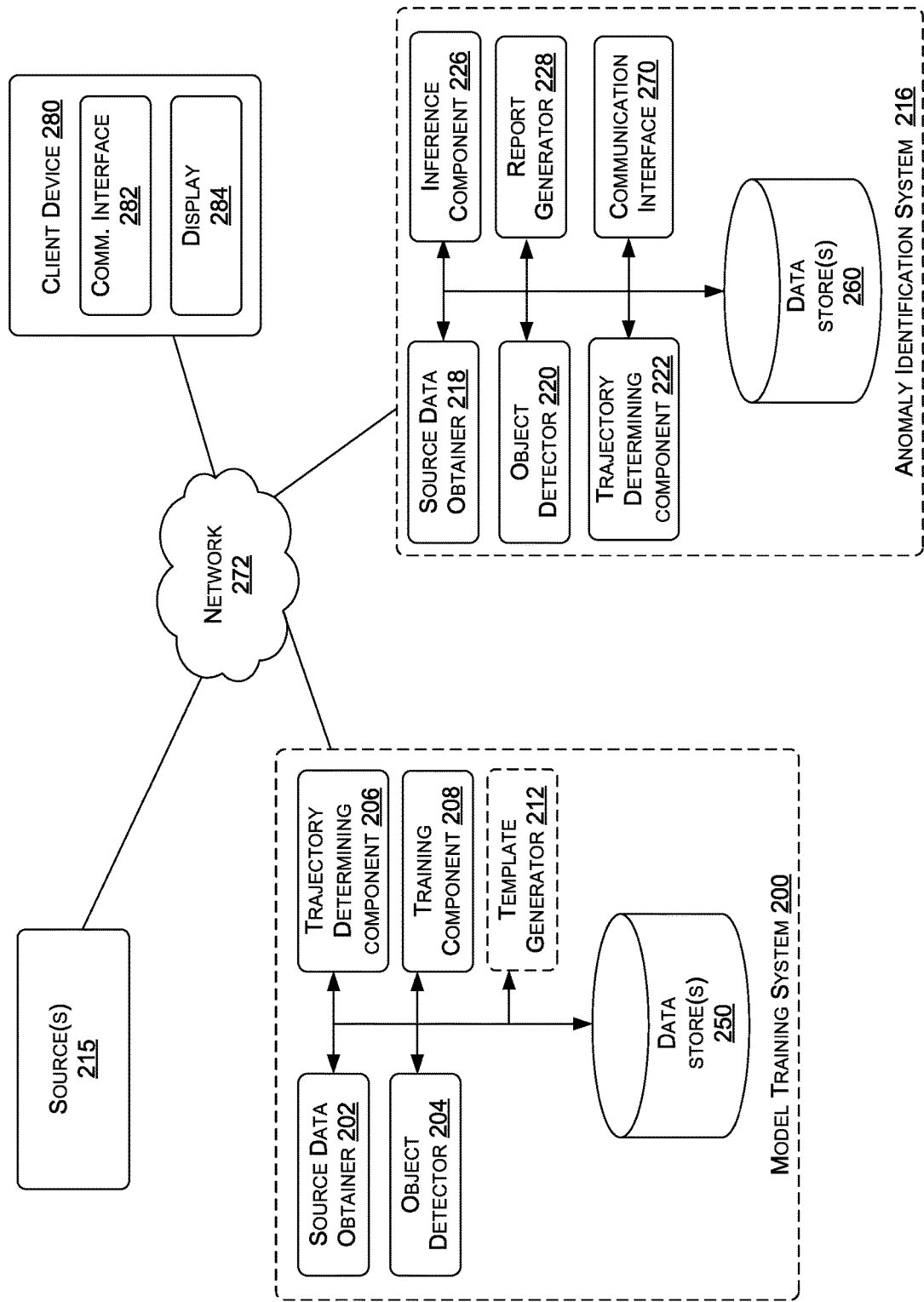
FIG. 2 is a block diagram depicting an example of an anomaly identification environment, in accordance with some embodiments of the present disclosure.

Now referring to FIG. 2, FIG. 2 is a block diagram depicting an anomaly identification environment in accordance with some embodiments of the present disclosure. The anomaly identification environment may correspond to the model training system 100 of FIG. 1 and anomaly identification system 116 of FIG. 1. The anomaly identification environment in FIG. 2 is generally illustrated to implement an embodiment in which trajectory templates are generated and used to identify object trajectory anomalies. The anomaly identification environment may include model training system 200, source(s) 215, anomaly identification system 216, and client device 280, which may be in communication via network 272.

In deployment, the source(s) 215 may sense or capture source data in an environment. Source data may include image data—representative of still images or a video—that depict object movement. For instance, in some cases, a sensor (e.g., a camera) within an environment may be used to capture various aspects of source data. For example, one or more cameras positioned within the environment may be used to image data (e.g., images and/or video) of the environment within a field(s) of view of the camera(s). As another example, one or more weather sensors, speed sensors, and/or other sensor types may be able to capture a temperature, a wind velocity, a precipitation measure, object speeds, accelerations, and/or velocities, and/or the like, of one or more aspects of the weather or the objects (e.g., vehicles, pedestrians, animals, drones, aircraft, etc.) in the environment.

The source data captured by the source 215 may be provided to the model training system 200 for training a machine learning model. The model training system 200 may include, among other things, a source data obtainer 202, an object detector 204, a trajectory determining component 206, a training component 208, a template generator 212, and a data store(s) 250. The data store(s) 250 may include any type of data, such as, for example, source data, training data, object trajectories, object trajectory attributes, the trained model(s), trajectory templates, and/or other data.

The source data obtainer 202 may obtain or collect data in a periodic manner, continuously, or as the data is collected by the source 215. Upon obtaining source data, the source data may be analyzed to obtain or generate training data for training the machine learning model. For instance, source data may be analyzed to identify or determine an object trajectory. In some examples, to determine an object trajectory, the object detector 204 may analyze the source data (e.g., video content) to identify or detect an object(s) within a field(s) of view of a sensor(s), or otherwise captured by a sensor(s) (e.g., coordinates captured by a GNSS sensor, etc.). Object detection may be performed in any number of ways, such as, for example, via machine learning (e.g., convolutional neural networks), computer vision algorithms, and/or the like.

The trajectory determining component 206 may determine or identify an object trajectory(ies) for the one or more detected objects. For instance, in some cases, machine learning algorithms may be used to track an object and convert pixels (e.g., 2D locations of pixels) associated with object movement to real world coordinates (e.g., 3D real-world coordinates). An object trajectory may be represented in any number of ways, such as, for example, a set or series of positions or coordinates of an object and corresponding times (e.g., timestamps). In some cases, object trajectories represented by a set of positions or coordinates of an object may be projected into a map view (e.g., for ease of visualization). In this way, a map visualization that includes a map of the environment (e.g., from a GPS application, from a satellite image, etc.) overlaid with a visualization (e.g., path) of the object trajectory may be generated. By way of example only, and not limitation, a map view may be a bird's eye-view projection of sensed vehicles or objects overlaid or integrated with a map.

The object trajectory(s) may be input into the training component 208 as training data. In addition to object trajectories, the training component 208 may also obtain and use additional training data, such as object trajectory attributes including weather conditions, lighting conditions, traffic conditions, day/time, etc. that may be obtained or determined from various sensors (e.g., cameras, weather gauges, etc.) in the environment (or other components/devices).

The training component 208 may use the object trajectories (e.g., represented by a set of coordinates and times associated with the object movement) and/or object trajectory attributes to generate a trained model. The training component 208 may be used to train any type of machine learning model, such as LSTM machine learning models.

As one example, the training component 208 may train a LSTM network by receiving as input an observed object trajectory and, in some cases, additional object trajectory attributes (e.g., weather conditions at time of object movement, traffic speed, acceleration, velocity, object type, etc.). The LSTM network may analyze the input and output a prediction of a subsequent position of the object (a predicted object position) based on the observed object trajectory. To train the LSTM network, the LSTM network may then correct for errors by comparing the predicted object position (or the observed object trajectory and the predicted object position) to the actual object trajectory. For instance, the predicted object position may be compared to the actual object trajectory of the object to correct for errors. As another example, a predicted object trajectory that includes the predicted object position and the observed trajectory may be compared to the actual trajectory of the object. The trained model may be captured or stored as trained model.

In some examples, the template generator 212 may use the trained model to generate trajectory templates. As described herein, trajectory templates may be generated in accordance with various object trajectory attributes, such as but not limited to those described herein (e.g., object movement attributes and/or the environment attributes). In this way, various trajectory templates corresponding with different attributes may be generated to, subsequently, compare with observed object trajectories for which anomalies are detected. By way of example, one trajectory template may correspond with a time period during which precipitation is occurring, while another trajectory template corresponds with a time period during which no precipitation is occurring. Trajectory templates may be generated in connection with any type and combination of attributes and is not intended to be limiting herein.

Anomaly identification system 216 may correspond to the anomaly identification system 116 of FIG. 1. Generally, the anomaly identification system 216 is configured to identify or determine anomalies, for example, to identify anomalies in object movement in real time. Source data captured by the source 215 may be provided to the anomaly identification system 216 for performing anomaly analysis. Anomaly identification system 216 may include a source data obtainer 218, object detector 220, trajectory determining component 222, an inference component 226, report generator 228, a communication interface 270, and a data store 260. The data store(s) 260 may include any type of data, such as, for example, source data, input data, object trajectories, object trajectory attributes, the deployed model(s), trajectory templates, reports, report features, and/or other data.

The source data obtainer 218 may obtain or collect data in a periodic manner, continuously, or as the data is collected by the source 215. Upon obtaining source data, the source data may be analyzed to obtain or generate input data for the inference component. For instance, source data may be analyzed to identify or determine an object trajectory. In embodiments, to determine an object trajectory, the object detector 220 may analyze the source data (e.g., video content) to identify or detect an object(s) within a video, that is, an object(s) within the field of view of the camera. Object detection may be performed in any number of ways, such as, for example, via machine learning (e.g., convolutional neural networks) or other computer vision algorithms.

In accordance with detecting an object, the trajectory determining component 222 may determine or identify an object trajectory. For instance, in some cases, machine learning algorithms may be used to track an object and convert pixels associated with object movement to real world coordinates. An object trajectory may be represented in any number of ways, such as, for example, a set or series of positions or coordinates of an object and corresponding times (e.g., timestamps). In some cases, object trajectories represented by a set of positions or coordinates of an object may be projected into a map view (e.g., for ease of visualization). In this way, a map visualization that includes a map of the environment overlaid with a visualization (e.g., path) of the object trajectory may be generated. By way of example only, and not limitation, a map view may be a bird's eye-view projection of sensed vehicles or objects overlaid or integrated with a map.

The inference component 226 may generally be configured to detect anomalies associated with object and/or movement associated therewith. To do so, the inference component 226 may determine an occurrence of or an extent of deviations of an observed and/or actual object trajectory. To identify deviations, the inference component 226 may compare an observed object trajectory with an expected object trajectory represented via trajectory template(s) to identify whether a deviation exists and/or an extent of a deviation. In cases that a deviation exists or an extent of a deviation exceeds a threshold value, the observed object trajectory may be designated as an anomaly.

In some examples, input data, such as an observed object trajectory(s), may be input into a deployed model to predict a subsequent position of an object, or set of object positions (generally referred to herein as predicted object position(s)). In accordance with the input data provided to the deployed model, such as an object trajectory associated with an object, the deployed model may predict a subsequent position, or set of positions, of the object. As can be appreciated, the deployed model may utilize various types of input data to predict a subsequent position, or set of positions. For example, object trajectory attributes, such as day/time, weather conditions, lighting conditions, and/or traffic conditions, may be used by the deployed model to predict a subsequent position or set of positions. Further, in some cases, the deployed model may predict other attributes associated with the object trajectory. For example, the deployed model may predict or provide a time(s) associated with the predicted subsequent position(s) of the object.

The inference component 226 may then use a predicted object position(s) output by the deployed model, or predicted object trajectory (including the observed object trajectory and the predicted object position(s) output by the deployed model) to identify an object trajectory anomaly. In particular, the inference component 226 may obtain the predicted object position(s) or predicted object trajectory as an expected object trajectory. The inference component 226 may then compare the expected object trajectory to the actual object trajectory. As one example, a predicted object position(s) generated from the deployed model based on an observed object trajectory, or portion thereof, is compared to the actual object trajectory. As another example, a predicted object position(s) is output from the deployed model based on at least a portion of an observed object trajectory. The inference component 226 may aggregate or combine the predicted object position(s) with the observed object trajectory to generate a predicted object trajectory. Such a predicted object trajectory is then compared to the actual trajectory of the object. Based on the comparison, the inference component 226 may generate a deviation score to indicate an amount of deviation between the predicted object trajectory and the actual object trajectory. For example, the inference component 226 may output a confidence score (e.g., between 0 and 1) to indicate an amount of deviation. Based on the deviation score, a determination may be made as to whether the actual object trajectory is indicative of an anomaly. For instance, when the deviation score exceeds a threshold value (e.g., a threshold of 0.4 on a scale of 0 to 1), the actual object trajectory may be deemed or designated as an anomaly.

In other examples, the inference component 226 may use a trajectory template, or set of templates, to identify an object trajectory anomaly. In particular, the inference component 226 may obtain an observed object trajectory, for example, as input data. The inference component 226 may then compare the object trajectory to one or more trajectory templates representing an expected object trajectory(s). As one example, based on an input object trajectory and/or attributes associated therewith (e.g., weather conditions, lighting conditions, traffic conditions, time period, etc.), the inference component 226 may reference a corresponding trajectory template(s) from the trajectory templates. The object trajectory may then be compared to the trajectory template(s). Based on the comparison, the inference component 226 may generate a deviation score or confidence score to indicate an amount of deviation between the deviation template representing a normal or expected object trajectory and the actual object trajectory. For instance, the inference component 126 may output a confidence score (e.g., between 0 and 1) to indicate an amount of deviation.

As can be appreciated, in cases that the actual object trajectory is compared to multiple trajectory templates (e.g., a first template with corresponding weather conditions and a second template with corresponding time and/or day), multiple deviation scores may be generated in association with each template. Alternatively, a global score may be generated. Based on the deviation score(s), a determination may be made as to whether the actual object trajectory is indicative of an anomaly. For instance, when the deviation score exceeds a threshold value (e.g., 0.4), the actual object trajectory may be deemed or designated as an anomaly.

The report generator 228 may generate the reports indicating information associated with object trajectories, such as anomalies. The reports may include various types of information or features related to object trajectories. Features related to object trajectories, or object trajectory features, may include, for instance, indications of object trajectory anomalies, amounts of deviation of object trajectories, object speed, object velocity, object acceleration, object direction, objection location details, object steering angles, lane in which object is positioned, traffic flow rates, or the like. Such features may be specific to an object trajectory or representative of a set of object trajectories.

The report generator 228 may also generate features or data to include in the report. For example, the report generator 228 may use the object trajectory (and/or corresponding attributes), anomaly inferences, deviation inferences, trajectory templates, predicted object positions, and/or the like to determine features related to object trajectories. A report may include a set of predefined features or a set of features identified in real-time (e.g., a pattern or frequency of a particular feature, such as a decreased speed detected among multiple objects).

A report may be generated in any number of forms including graphs, charts, tables, text, audio, video, and/or other forms of information and may be generated persistently, at intervals, upon user request, and/or at another cadence. The reports, or data associated therewith (e.g., features), may be stored as reports. The reports may be transmitted to a client device(s) associated with users of the anomaly identification system 216.

The communication interface 270 may include one or more components, features, modules, and/or the like for communicating over one or more networks (e.g., the Internet, local area networks (LANs), wide area networks (WANs), low power wide area networks (LPWANs), cellular networks (e.g., LTE, 4G, 5G, etc.), public switched telephone networks (PSTN), Internet of things (IoT) networks (e.g., z-wave, ZigBee, etc.), and/or other network types.

The anomaly identification system 216 may be connected (e.g., communicatively coupled) to the network (Internet/PSTN) 272 via the communication interface 270. The anomaly identification system 216 may communicate with the model training system 200, the client device(s) 280, and/or one or more other systems or devices. The anomaly identification system 216 may transmit one or more messages (e.g., signals) to the client device(s) 280, where the messages include the report(s) and/or data for generating the report(s). The anomaly identification system 216 may further transmit other data for use by the client device(s) 280 (e.g., for use by an application associated with training, deploying, and/or monitoring anomalies of object trajectories).

The client device(s) 280 may include one or more of a smart phone, laptop computer, desktop computer, tablet computer, wearable device (e.g., a smart watch, intelligent eye glasses, etc.), smart-home device, such as smart-home devices including digital personal assistants, and/or any other type of device. In some examples, the client device(s) 280 may include some or all of the features and functionality of the computing device 700 of FIG. 7, described below.

The client device(s) 280 may include a communication interface 282, similar to the communication interface 270, for communication with one or more other devices and/or systems. The client device(s) 280 may receive the report(s) and/or other data and information related to object trajectories.

The client device(s) 280 may include one or more applications for presenting information (e.g., the report(s)) to the user. The application(s) may output the information via the display 284. The application(s) may include one or more graphical user interfaces (GUIs) for viewing, interacting with, and/or navigating through the report(s) and/or information generated by the anomaly identification system 216, the model training system 200, other client device(s) 280, and/or other devices or systems. FIGS. 3A-3E, described in more detail below, illustrate examples of GUIs for displaying the report(s) and/or other information.

Although the model training system 200 and the anomaly identification system 216 are illustrated as separate systems, this is not intended to be limiting. For example, the model training system 200, the anomaly identification system 216, and/or one or more other systems may be the same system, may share one or more features and/or components, and/or may otherwise be combined. In addition, although the anomaly identification system 216 is illustrated as being connected to the network 272 and a client device 280, this also is not intended to be limiting. For example, the model training system 200, the anomaly identification system 216, and/or one or more other systems may be connected to (e.g., communicatively coupled to) the network 272 and/or the client device 280 (and/or other client devices). In addition, the model training system 200, the anomaly identification system 216, and/or one or more other systems may be connected to each other via the network 272 (e.g., communicatively coupled). As such, the model training system 200 may include a communication interface, similar to the communication interface 270 of the anomaly identification system 216.

Now referring to FIGS. 3A-3E, FIGS. 3A-3E include examples of a graphical user interface(s). The GUI(s) may be from an application for training a machine learning model(s), viewing reports or otherwise interacting with a system, and/or for performing one or more other tasks (e.g., tasks associated with the anomaly identification system). Although some GUIs show some features, and other GUIs show other features, this is not intended to be limiting. For example, any of the GUIs may include features from any other GUIs, including but not limited to those described herein.

Figure 3A:
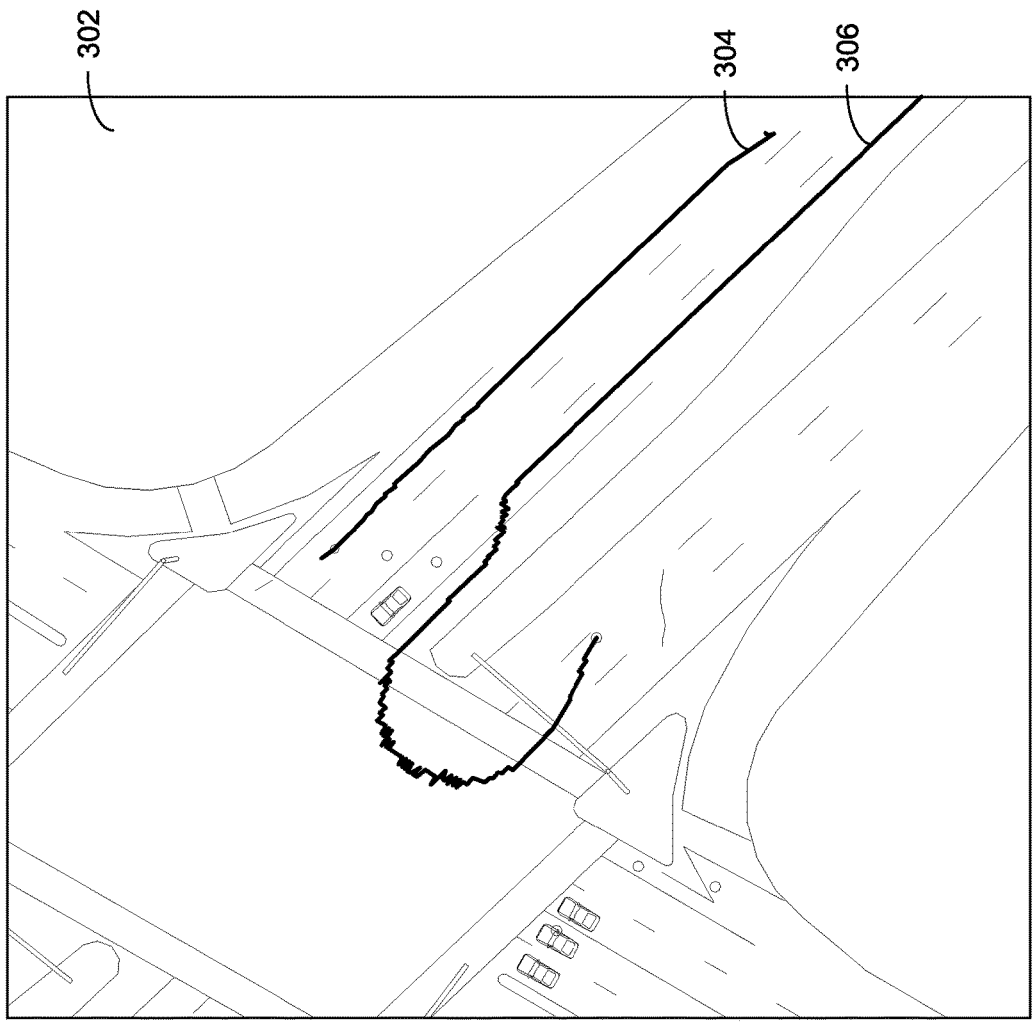
FIG. 3A is an example graphical user interface (GUI) for displaying and reporting object trajectories, in accordance with some embodiments of the present disclosure.

FIG. 3A is an example user interface 302 that displays a map view of observed object trajectories. The user interface includes a first object trajectory 304 and a second object trajectory 306. First object trajectory 304 and second object trajectory 306 may be determined, in some examples, from image data (e.g., a video) representative of motion of objects (e.g., vehicles, pedestrians, animals, etc.) and the identified trajectory projected in a bird's eye-view and/or map-view.

Figure 3B:
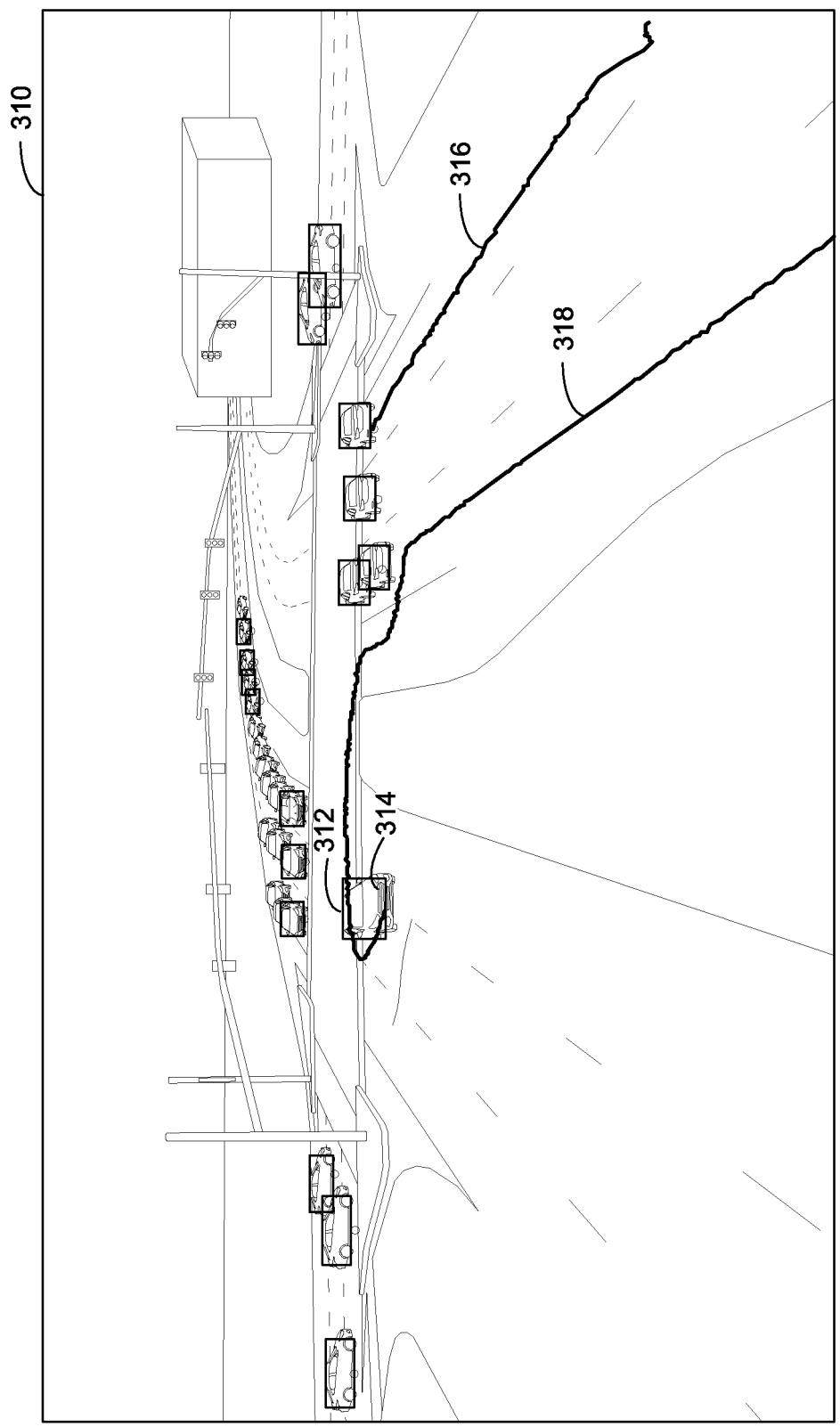
FIG. 3B is another example graphical user interface (GUI) for displaying and reporting object trajectory anomalies, in accordance with some embodiments of the present disclosure.

FIG. 3B is an example user interface 310 presenting a video or still image captured by a camera positioned in the environment. Upon detecting an anomaly (e.g., in accordance with embodiments described herein), detected anomalies may be presented in the video, for example, in real-time. As illustrated, various detected objects are visually emphasized, in this case with bounding boxes around the objects. For example, bounding box 312 bounds vehicle 314. In some cases, object trajectories may also be visually depicted, such as object trajectory 316 and 318. Upon determining an anomaly, such as the deviation in driving pattern of vehicle 314, the anomaly may be visually emphasized or otherwise depicted in the user interface 310. For instance, bounding box 312 bounding vehicle 314 may be presented in a color (e.g., red) indicative of an anomaly.

Figure 3C:
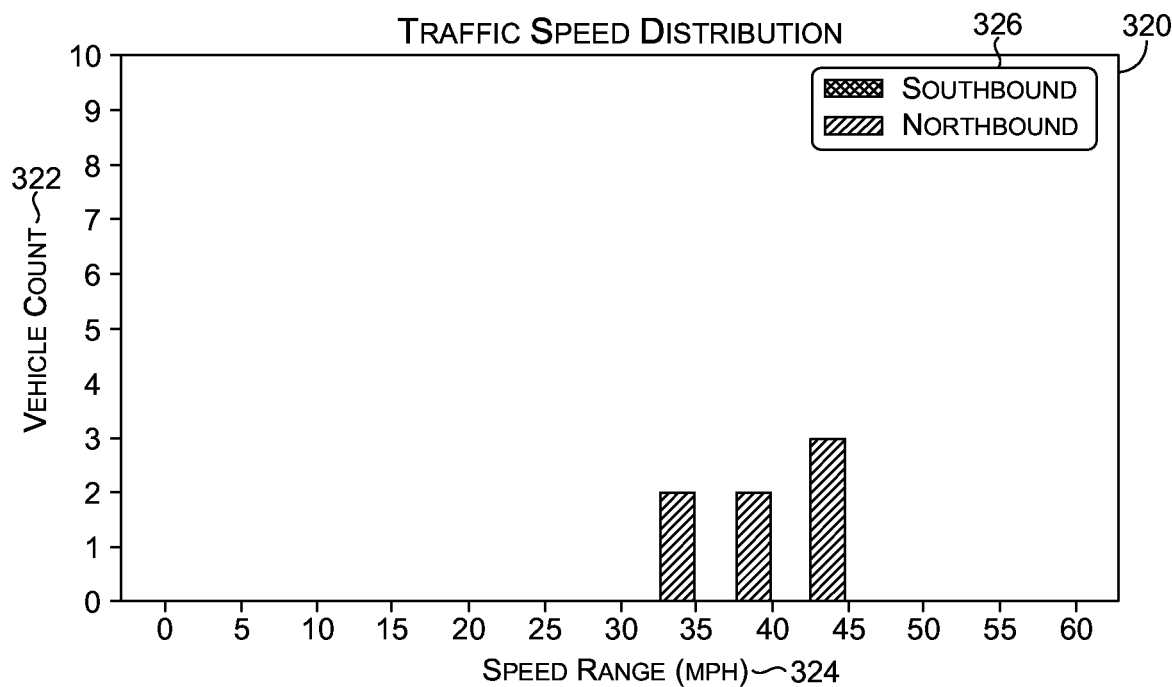
FIG. 3C is another example graphical user interface (GUI) for displaying and reporting a trajectory feature, in accordance with some embodiments of the present disclosure.

FIG. 3C is an example user interface 320 presenting one example of a traffic analysis feature that may be determined and presented to a user. In the example user interface 320, traffic speed distribution of various vehicles may be determined (e.g., using observed object trajectories) and presented. In this example, the graph shows the number of vehicles 322 moving at various speed ranges 324. The direction 326 of the vehicles' movement may also be illustrated.

Figure 3D:
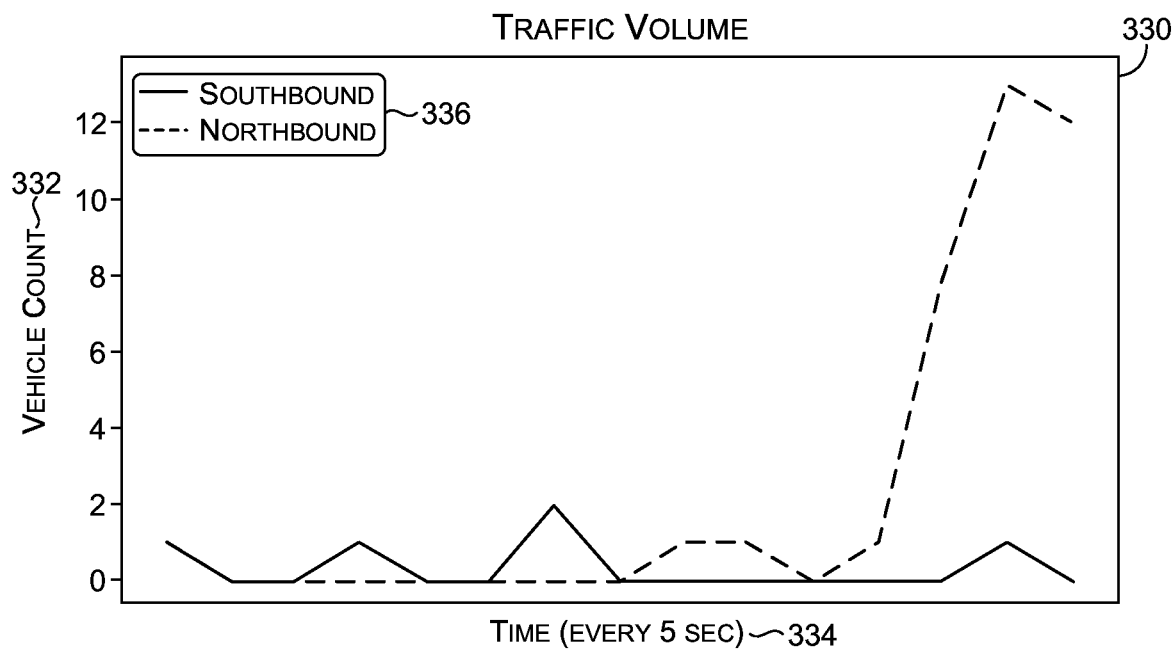
FIG. 3D is another graphical user interface (GUI) for displaying and reporting a trajectory feature, in accordance with some embodiments of the present disclosure.

FIG. 3D is another example user interface 330 presenting an example of a traffic analysis feature that may be determined and presented to a user. In the example user interface 330, the traffic volume may be determined (e.g., using observed object trajectories) and presented. In this example, the graph shows the number of vehicles 332 at various times 334. The direction 336 of the movement of the vehicles may also be illustrated.

Figure 3E:
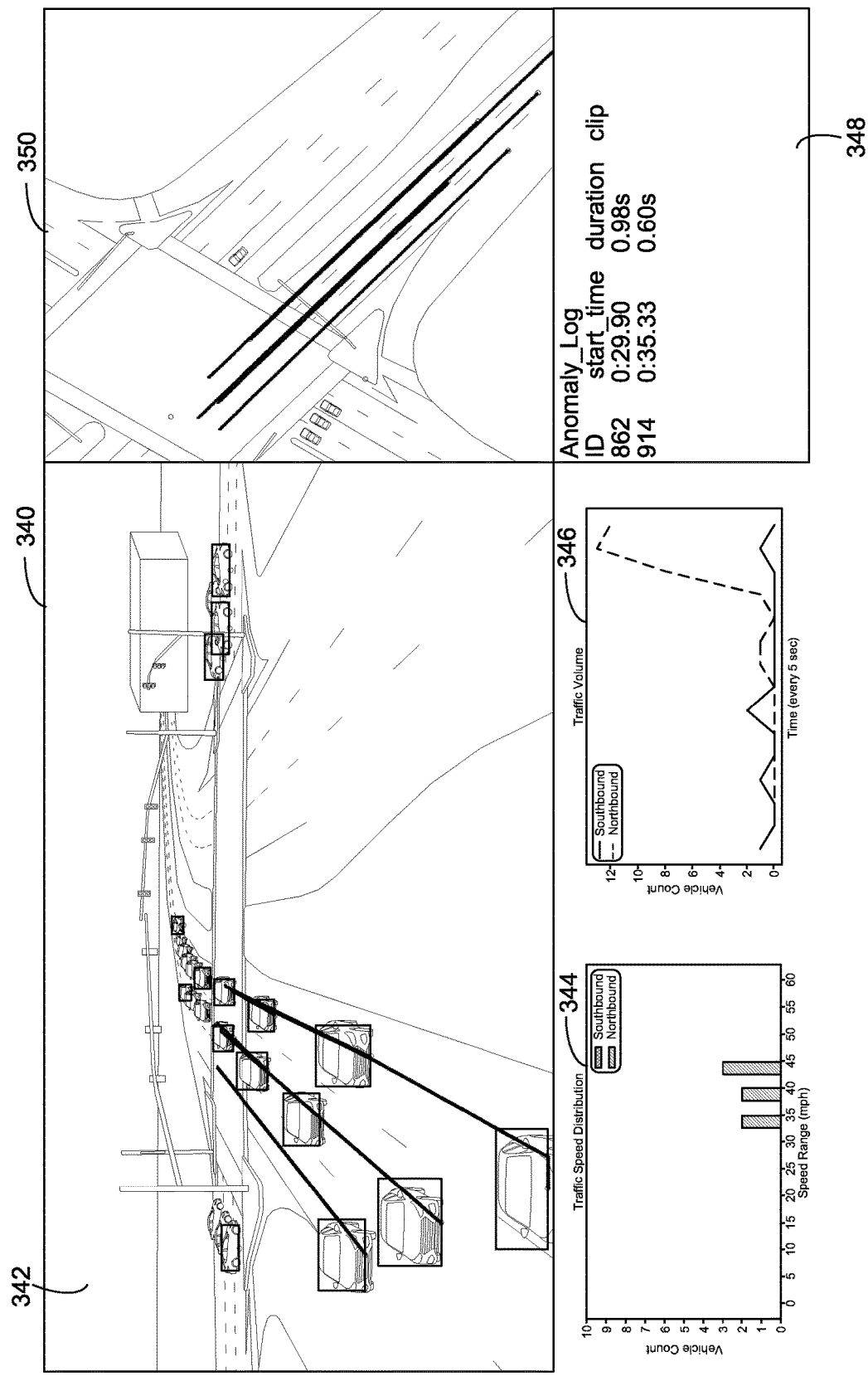
FIG. 3E is another graphical user interface (GUI) for displaying and reporting anomalies and features, in accordance with some embodiments of the present disclosure.

FIG. 3E is an example user interface 340 presenting an example dashboard view providing various features related to object trajectories. In addition to presenting a video or still image 342 captured by a camera positioned in the environment, traffic speed distribution 344, traffic volume 346, the user interface 340 may present an anomaly log 348. The anomaly log may provide indications (e.g., a listing) of the detected anomalies. In some cases, the anomalies may be visually displayed via object trajectories projected in a bird's eye-view or map-view 350. Other trajectory features may additionally or alternatively be presented to provide information or alert a user of aspects associated with object trajectories.

Figure 4:
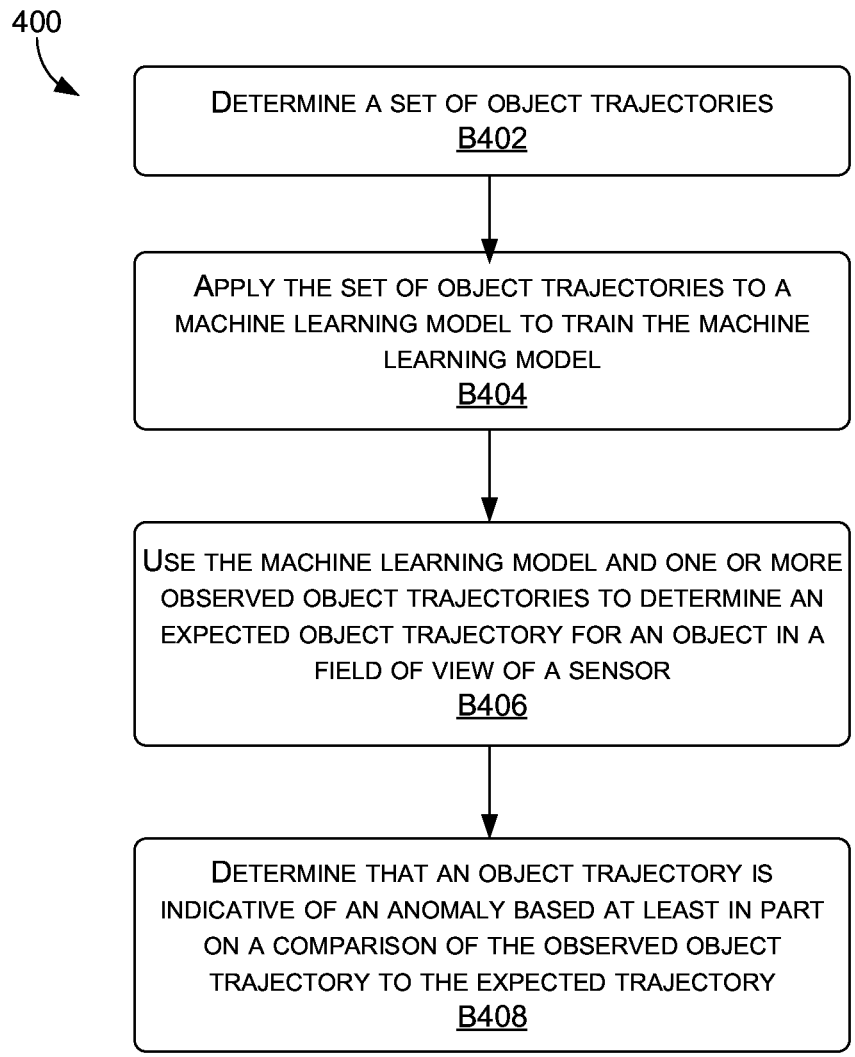
FIG. 4 is a flow diagram showing a method for anomaly identification, in accordance with some embodiments of the present disclosure.
Figure 5:
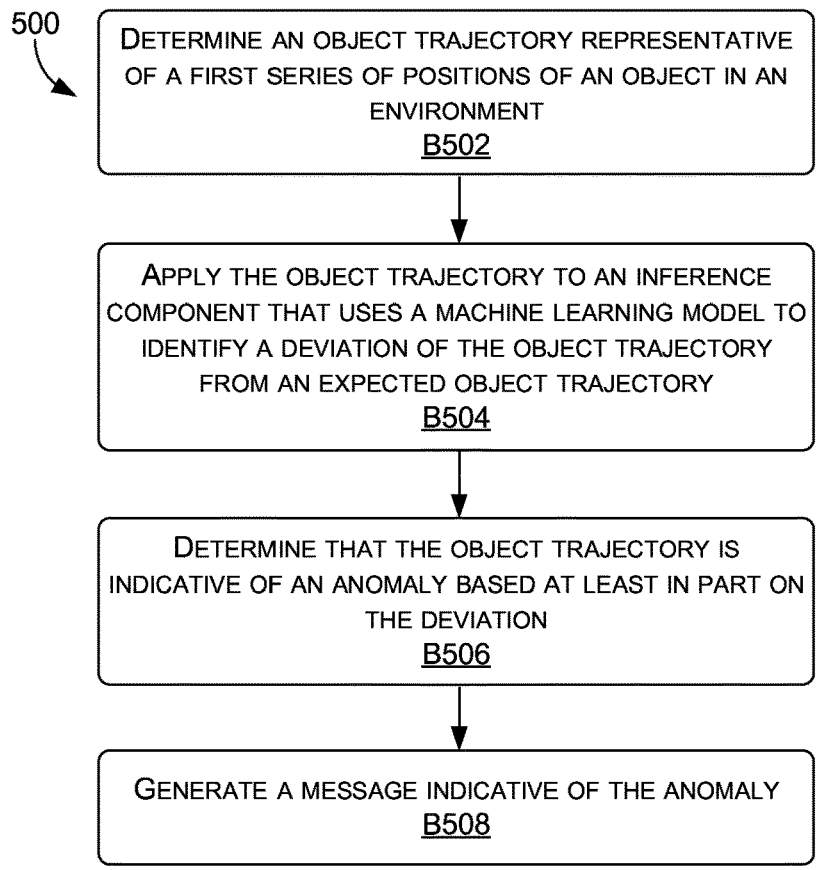
FIG. 5 is a flow diagram showing another method for anomaly identification, in accordance with some embodiments of the present disclosure.
Figure 6:
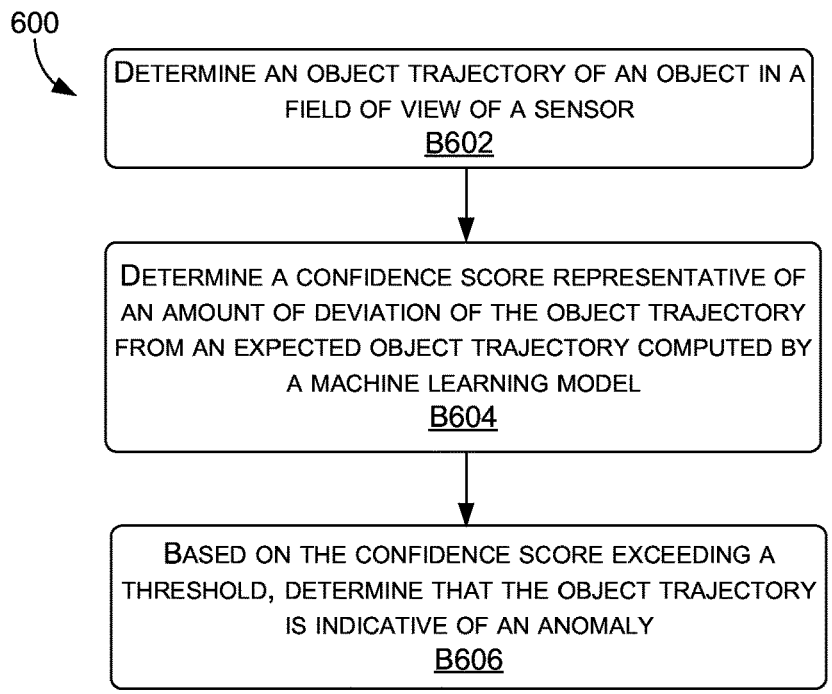
FIG. 6 is a flow diagram showing another method for anomaly identification, in accordance with some embodiments of the present disclosure.

Now referring to FIGS. 4-6, each block of methods 400-600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Methods 400-600 are described, by way of example, with respect to the model training system (FIGS. 1 and 2) and the anomaly identification system (FIGS. 1 and 2). However, these methods may additionally or alternatively be executed by any one system, or any combination of systems, including, but not limited to, those described herein.

FIG. 4 is a flow diagram showing a method 400 for anomaly identification in accordance with some embodiments of the present disclosure. The method 400, at block B402, includes determining a set of object trajectories. In some examples, source content may be analyzed to track object(s) represented by the source content and to generate object trajectories representing the path of movement(s) for the object(s).

The method 400, at block B404, includes applying the set of object trajectories to a machine learning model to train the machine learning model. For example, the set of object trajectories may be applied to a LSTM network to train the LSTM network.

The method 400, at block B406, includes using the machine learning model (e.g., LSTM network) and one or more observed object trajectories to determine an expected object trajectory for an object in the field of view of the sensor (e.g., the source 115). In some implementations, the expected object trajectory may be determined by inputting an object trajectory into the machine learning model and obtaining as output at least one predicted object position to represent (at least partially) the expected object trajectory(ies). In other examples, the expected object trajectory(ies) may be determined by inputting various object trajectories (e.g., the set of determined object trajectories) into the machine learning model for use in generating a trajectory template(s) to represent the expected object trajectory(ies).

The method 400, at block B408, includes determining an object trajectory is indicative of an anomaly based at least in part on a comparison of the observed object trajectory to the expected object trajectory.

FIG. 5 is a flow diagram showing another method 500 for anomaly identification in accordance with some embodiments of the present disclosure. The method 500, at block B502, includes determining an object trajectory representative of a first series of positions of an object in an environment. Such an object trajectory may be determined by analyzing source data representative of one or more aspects and/or features of the environment in which the object is moving.

The method 500, at block B504, includes applying the object trajectory to an inference component that uses a machine learning model to identify a deviation of the object trajectory from an expected object trajectory. The deviation may be identified based at least in part on differences between the first series of positions and a second series of positions representing the expected object trajectory.

The method 500, at block B506, includes determining that the object trajectory is indicative of an anomaly based at least in part on the deviation. For example, the inference component may determine, based at least in part on a comparison of an observed object trajectory to an expected object trajectory, that the observed object trajectory is anomalous.

The method 500, at block B508, includes generating a message indicative of the anomaly. Such a message may be provided to communicate an alert or indication of the anomaly to one or more client devices (e.g., client device 280).

Turning now to FIG. 6, FIG. 6 is a flow diagram showing another method 600 for anomaly identification in accordance with some embodiments of the present disclosure. The method 600, at block B602, includes determining an object trajectory of an object in a field of view of a sensor (e.g., a source 115) based at least in part on source data generated by the sensor.

The method 600, at block B604, includes determining a confidence score representative of an amount of deviation of the object trajectory from an expected object trajectory computed by a machine learning model based on learned and/or observed object trajectories.

The method 600, at block B606, includes determining that the object trajectory is indicative of an anomaly based at least in part on the confidence score exceeding a threshold. Such an anomaly may be reported to alert or notify one or more components of the system of the anomaly.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Figure 7:
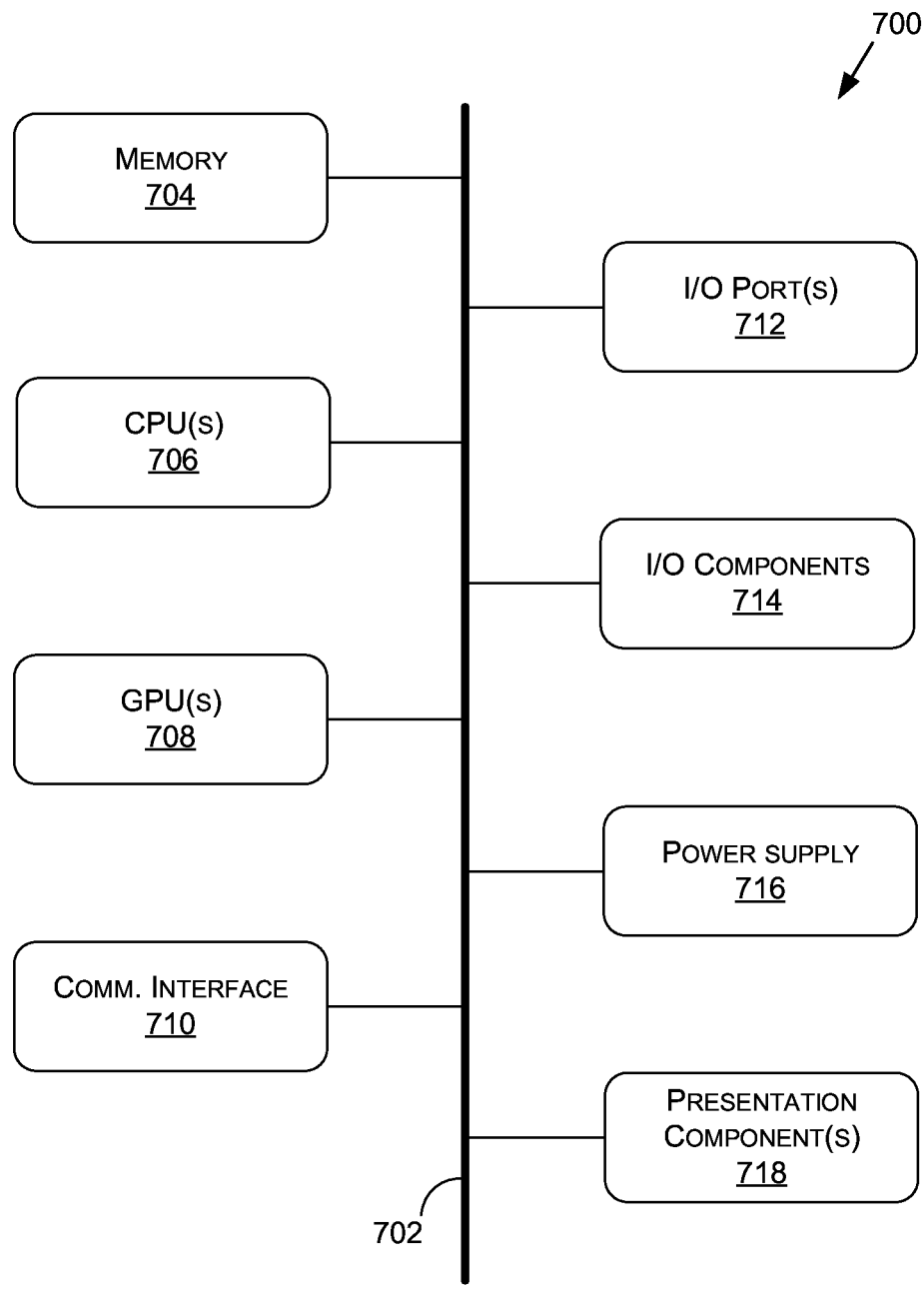
FIG. 7 is a block diagram of an example computing environment suitable for use in implementing some embodiments of the present disclosure.

FIG. 7 is a block diagram of an example computing device 700 suitable for use in implementing some embodiments of the present disclosure. Computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)).

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link) When combined together, each GPU 708 may generate pixel data for different portions of an output image or for different output images (e.g., a first GPU for a first image and a second GPU for a second image). Each GPU may include its own memory, or may share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining, based at least in part on sensor data generated using a sensor statically positioned relative to a roadway and representative of a field of view of at least a portion of the roadway, one or more object trajectories corresponding to one or more objects traveling through the portion of the roadway;
    applying the one or more object trajectories and an indication of environment attributes including at least one of weather conditions or lighting conditions to a long short-term memory (LSTM) network to train the LSTM network;
    computing, by the LSTM network and based at least in part on one or more observed object trajectories and corresponding weather conditions or lighting conditions, a plurality of trajectory templates, wherein each trajectory template corresponds with a different weather condition or lighting condition;
    selecting a trajectory template, from the plurality of trajectory templates, based on a particular weather condition or lighting condition associated with a particular object; and
    determining that an object trajectory of the particular object associated with the particular weather condition or lighting condition is indicative of an anomaly based at least in part on a comparison of the object trajectory to the selected trajectory template associated with the particular weather condition or lighting condition.

2. The method of claim 1, wherein the sensor is a camera, and the method further comprises determining the object trajectory of the particular object by:
    detecting the particular object in image data generated by the camera; and
    determining a corresponding real-world position of the particular object at a plurality of times based at least in part on the image data.

3. The method of claim 1, further comprising determining the object trajectory of the particular object by determining a position of the particular object over a plurality of times, and wherein the position of the particular object is determined using one or more parameters associated with the sensor.

4. The method of claim 1, further comprising generating a visualization of the object trajectory overlaid on an image, the visualization including an indication of the anomaly when it is determined that the object trajectory is indicative of the anomaly.

5. The method of claim 1, wherein the particular object includes at least one of: a vehicle, an animal, or a human.

6. The method of claim 1, wherein the LSTM network is trained over time to adapt to object behavior observed over time.

7. The method of claim 1, wherein selection of the trajectory template is based on the particular weather condition associated with the particular object, and further comprising:
    selecting a second trajectory template based on the lighting condition associated with the particular object, wherein the trajectory template and the second trajectory template are used to determine that the object trajectory of the particular object is indicative of the anomaly.

8. The method of claim 1, further comprising:
    selecting a second trajectory template based on a time period or a traffic condition associated with the particular object;
    generating a first deviation score based on a comparison of the object trajectory of the particular object with the trajectory template;
    generating a second deviation score based on a comparison of the object trajectory of the particular object with the second trajectory template;
    generating a global deviation score for the object trajectory based on the first deviation score and the second deviation score; and
    using the global deviation score to determine that the object trajectory of the particular object is indicative of the anomaly.

9. A system comprising:
    one or more processors comprising processing circuitry to:
    determine, based at least in part on sensor data generated using a sensor statically positioned relative to a roadway and representative of a field of view of at least a portion of the roadway, one or more object trajectories corresponding to one or more objects traveling through the portion of the roadway;
    apply the one or more object trajectories and an indication of environment attributes including at least one of weather conditions or lighting conditions to a long short-term memory (LSTM) network to train the LSTM network;

compute, by the LSTM network and based at least in part on one or more observed object trajectories and corresponding weather conditions or lighting conditions, a plurality of trajectory templates, wherein each trajectory template corresponds with a different weather condition or lighting condition;

select a trajectory template, from the plurality of trajectory templates, based on a particular weather condition or lighting condition associated with a particular object; and determine that an object trajectory of the particular object associated with the particular weather condition or lighting condition is indicative of an anomaly based at least in part on a comparison of the object trajectory to the selected trajectory template associated with the particular weather condition or lighting condition.

10. The system of claim 9, wherein the sensor is a camera, and the processing circuitry is further to determine the object trajectory of the particular object by:

detecting the particular object in image data generated by the camera; and determining a corresponding real-world position of the particular object at a plurality of times based at least in part on the image data.

11. The system of claim 9, wherein the one or more processors comprising processing circuitry are further configured to determine the object trajectory of the particular object by determining a position of the particular object over a plurality of times, and wherein the position of the particular object is determined using one or more parameters associated with the sensor.

12. The system of claim 9, wherein the one or more processors comprising processing circuitry are further configured to generate a visualization of the object trajectory overlaid on an image, the visualization including an indication of the anomaly when it is determined that the object trajectory is indicative of the anomaly.

13. The system of claim 9, wherein the particular object includes at least one of: a vehicle, an animal, or a human.

14. The system of claim 9, wherein the LSTM network is trained over time to adapt to object behavior observed over time.

15. The system of claim 9, wherein selection of the trajectory template is based on the particular weather condition associated with the particular object, and wherein the one or more processors comprising processing circuitry are further configured to:

select a second trajectory template based on the lighting condition associated with the particular object, wherein the trajectory template and the second trajectory template are used to determine that the object trajectory of the particular object is indicative of the anomaly.

16. The system of claim 9, wherein the one or more processors comprising processing circuitry are further configured to:

selecting a second trajectory template based on a time period or a traffic condition associated with the particular object;

generating a first deviation score based on a comparison of the object trajectory of the particular object with the trajectory template;

generating a second deviation score based on a comparison of the object trajectory of the particular object with the second trajectory template;

generating a global deviation score for the object trajectory based on the first deviation score and the second deviation score; and using the global deviation score to determine that the object trajectory of the particular object is indicative of the anomaly.

17. A processor comprising:

processing circuitry to:

determine, based at least in part on sensor data generated using a sensor statically positioned relative to a roadway and representative of a field of view of at least a portion of the roadway, one or more object trajectories corresponding to one or more objects traveling through the portion of the roadway;

apply the one or more object trajectories and an indication of environment attributes including at least one of weather conditions or lighting conditions to a long short-term memory (LSTM) network to train the LSTM network;

compute, by the LSTM network and based at least in part on one or more observed object trajectories and corresponding weather conditions or lighting conditions, a plurality of trajectory templates, wherein each trajectory template corresponds with a different weather condition or lighting condition;

select a trajectory template, from the plurality of trajectory templates, based on a particular weather condition or lighting condition associated with a particular object; and determine that an object trajectory of the particular object associated with the particular weather condition or lighting condition is indicative of an anomaly based at least in part on a comparison of the object trajectory to the selected trajectory template associated with the particular weather condition or lighting condition.

18. The processor of claim 17, wherein the sensor is a camera, and the processing circuitry is further configured to determine the object trajectory of the particular object by:

detecting the particular object in image data generated by the camera; and determining a corresponding real-world position of the particular object at a plurality of times based at least in part on the image data.

19. The processor of claim 17, wherein the processing circuitry is further configured to determine the object trajectory of the particular object by determining a position of the particular object over a plurality of times, and wherein the position of the particular object is determined using one or more parameters associated with the sensor.

20. The processor of claim 17, wherein the processing circuitry is further configured to generate a visualization of the object trajectory overlaid on an image, the visualization including an indication of the anomaly when it is determined that the object trajectory is indicative of the anomaly.

* * * * *